US012592095B2

(12) United States Patent
Das et al.

(10) Patent No.: US 12,592,095 B2
(45) Date of Patent: Mar. 31, 2026

(54) METHOD AND SYSTEM OF DETERMINING SHAPE OF A TABLE IN A DOCUMENT

(71) Applicant: L&T TECHNOLOGY SERVICES LIMITED, Chennai (IN)

(72) Inventors: Tarun Kumar Das, Digboi (IN);
Triptesh Mallick, Bankura (IN);
Madhusudan Singh, Bangalore (IN);
Pragyesh Kumar, Prayagraj (IN);
Yelampalli Niranjan Reddy, Nandyal (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 338 days.

(21) Appl. No.: 18/202,975

(22) Filed: May 29, 2023

(65) Prior Publication Data

US 2024/0312231 A1 Sep. 19, 2024

(30) Foreign Application Priority Data

Mar. 17, 2023 (IN) .............................. 202341018211

(51) Int. Cl.
*G06V 30/412* (2022.01)
*G06V 30/146* (2022.01)
*G06V 30/18* (2022.01)

(52) U.S. Cl.
CPC ........ *G06V 30/1801* (2022.01); *G06V 30/147* (2022.01); *G06V 30/412* (2022.01)

(58) Field of Classification Search
CPC ............. G06V 30/1801; G06V 30/147; G06V 30/412; G06V 10/34; G06V 10/44
See application file for complete search history.

(56) References Cited

U.S. PATENT DOCUMENTS

2012/0236377 A1* 9/2012 Kaigawa ................ G06V 30/40
358/474

FOREIGN PATENT DOCUMENTS

JP 07282191 A * 10/1995

OTHER PUBLICATIONS

Performance Comparisons of Contour-Based Corner Detectors (Year: 2012).*

* cited by examiner

*Primary Examiner* — Huo Long Chen
(74) *Attorney, Agent, or Firm* — Kendal M. Sheets

(57) ABSTRACT

A method and system of determining shape of a table in a document is disclosed. A region of interest (ROI) from a binarized image of the document is determined is detected corresponding to the table based on detection of a plurality of lines. The ROI is extracted based on a minimum height threshold and a minimum width threshold of the document image. A cluster of points corresponding to each corner of the ROI are determined based on a height of the ROI and contour detection. A corner type of each corner is determined to be one of a 10 pointed corner or a curved corner and in case the corner type of least two corners is determined as the curved corner the shape of the table is determined as a rounded corner structure.

12 Claims, 5 Drawing Sheets

100

100

200

Figures 3B, 3C:
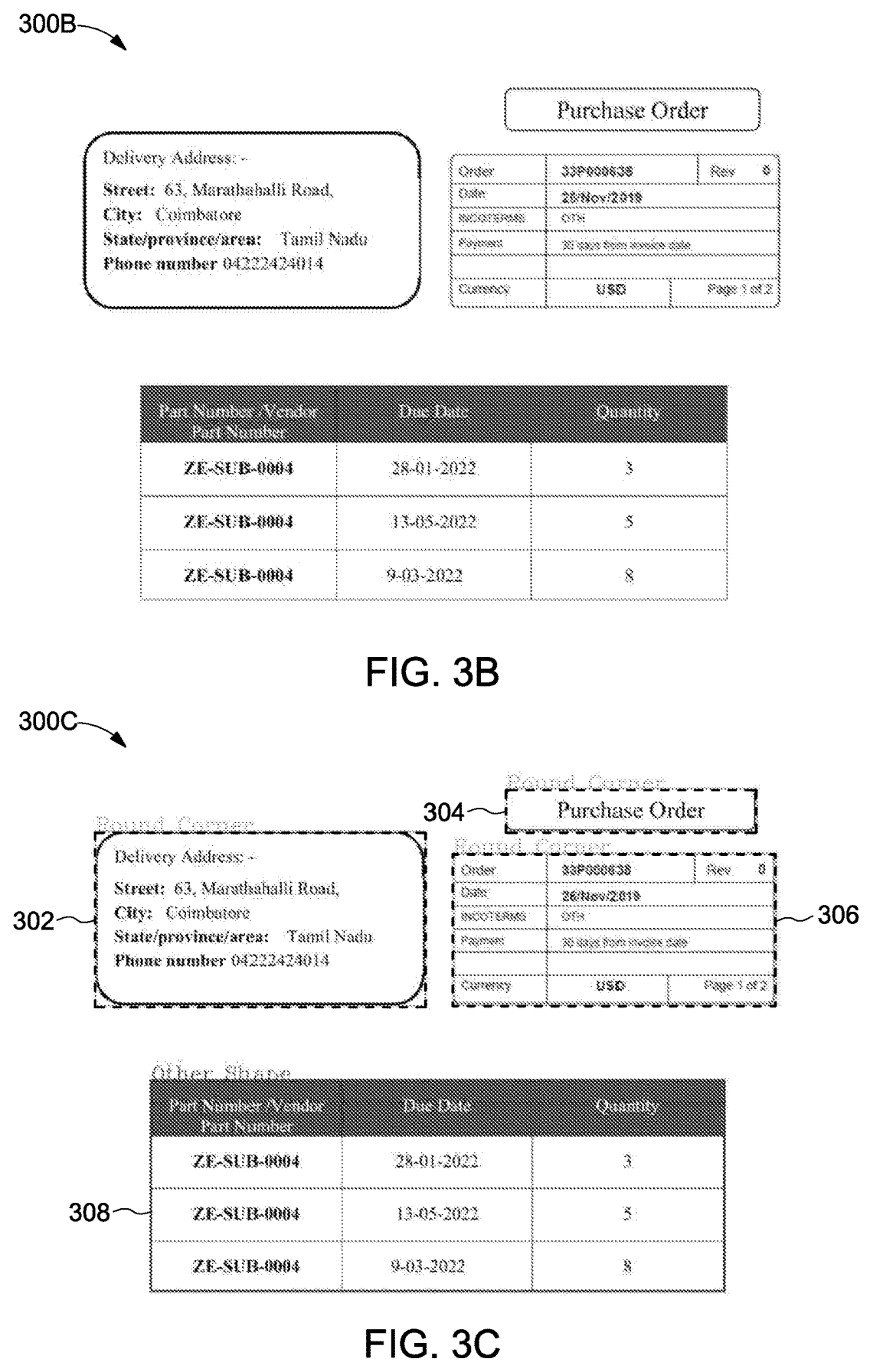

300B

Purchase Order

Delivery Address: -

Street: 63, Marathahalli Road,
City:  Coimbatore
State/province/area:  Tamil Nadu
Phone number 04222424014

| Order | 33P000838 | Rev | 0 |
|---|---|---|---|
| Date | 28-Nov-2019 | | |
| INCOTERMS | DTH | | |
| Payment | 30 days from invoice date | | |
| | | | |
| Currency | USD | Page 1 of 2 | |

| Part Number /Vendor Part Number | Due Date | Quantity |
|---|---|---|
| ZE-SUB-0004 | 28-01-2022 | 3 |
| ZE-SUB-0004 | 13-05-2022 | 5 |
| ZE-SUB-0004 | 9-03-2022 | 8 |

304 — Purchase Order

302 —

Delivery Address: -

Street: 63, Marathahalli Road,
City:  Coimbatore
State/province/area:  Tamil Nadu
Phone number 0422424014

| Order | 33P000838 | Rev | 0 |
|---|---|---|---|
| Date | 26-Nov-2019 | | |
| INCOTERMS | DTH | | |
| Payment | 30 days from invoice date | | |
| | | | |
| Currency | USD | Page 1 of 2 | |

— 306

308 —

| Part Number /Vendor Part Number | Due Date | Quantity |
|---|---|---|
| ZE-SUB-0004 | 28-01-2022 | 3 |
| ZE-SUB-0004 | 13-05-2022 | 5 |
| ZE-SUB-0004 | 9-03-2022 | 8 |

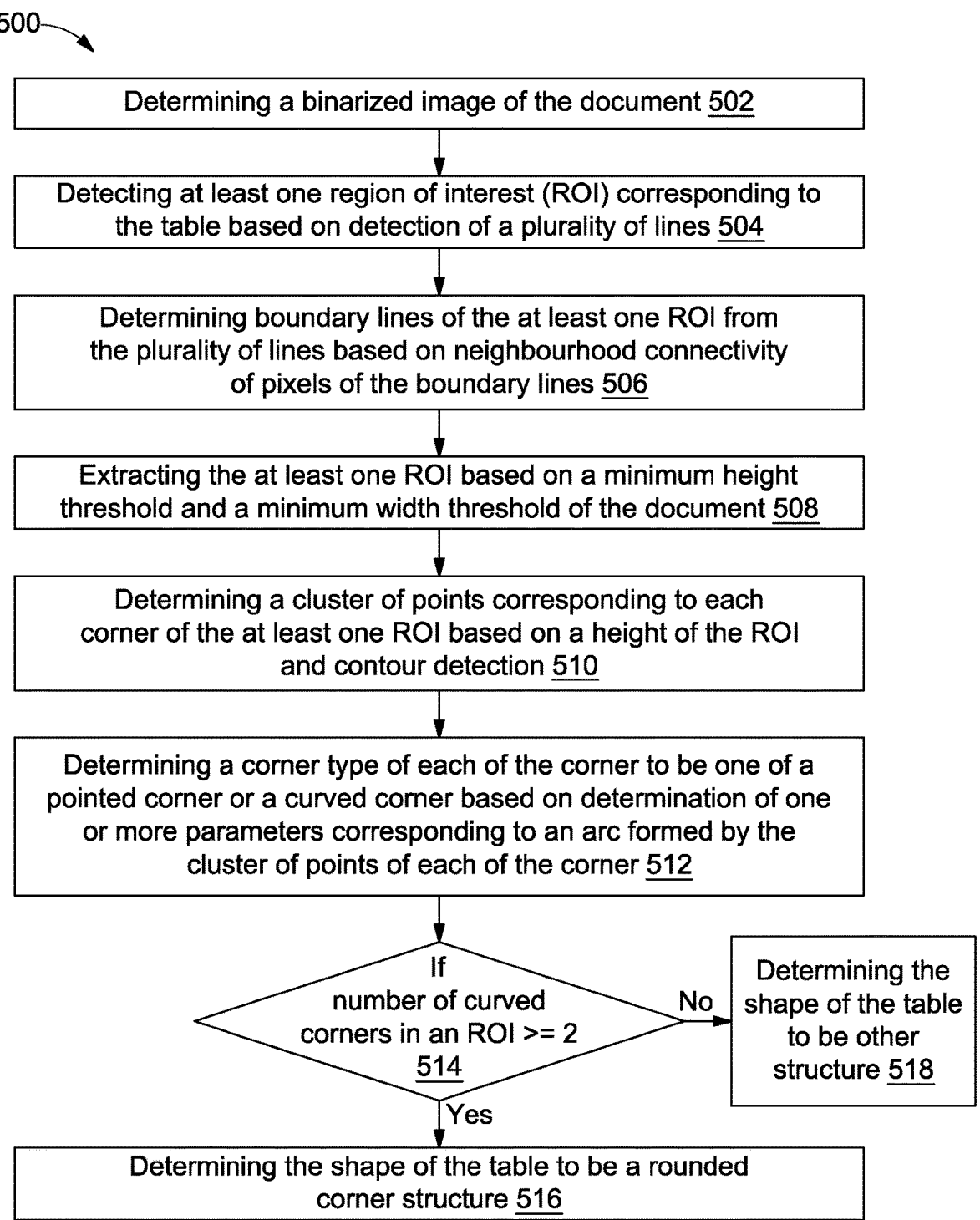

Determining a binarized image of the document 502

Detecting at least one region of interest (ROI) corresponding to the table based on detection of a plurality of lines 504

Determining boundary lines of the at least one ROI from the plurality of lines based on neighbourhood connectivity of pixels of the boundary lines 506

Extracting the at least one ROI based on a minimum height threshold and a minimum width threshold of the document 508

Determining a cluster of points corresponding to each corner of the at least one ROI based on a height of the ROI and contour detection 510

Determining a corner type of each of the corner to be one of a pointed corner or a curved corner based on determination of one or more parameters corresponding to an arc formed by the cluster of points of each of the corner 512

If number of curved corners in an ROI >= 2 514

No

Determining the shape of the table to be other structure 518

Yes

Determining the shape of the table to be a rounded corner structure 516

FIG. 5

METHOD AND SYSTEM OF DETERMINING SHAPE OF A TABLE IN A DOCUMENT

TECHNICAL FIELD

This disclosure relates generally to image processing, and more particularly to a system and a method for determining shape of a table in a document.

BACKGROUND

When extracting text data from a document using Optical Character Recognition (OCR), data in certain structures and shapes of tables in the document may be difficult to extract. In general, most table shape determination techniques in a document can only recognize a rectangular or square shaped tables which have sharp edges only. However, any table which is shaped different than a rectangle or a square may not be recognized and accordingly, the determination of such tabular structures may not be accurate.

Therefore, there is a requirement to determine a shape of a table in a document in order to extract correct data by performing OCR from a document having tables of different structures.

SUMMARY OF THE INVENTION

In an embodiment, a method of determining shape of a table in a document is provided. The method may be performed by a processor which may determine a binarized image of the document. The method may further include detecting at least one region of interest (ROI) corresponding to the table based on detection of a plurality of lines. In an embodiment, the plurality of lines may be detected based on a morphological operation. The method further includes determining boundary lines of the at least one ROI from the plurality of lines based on neighbourhood connectivity of pixels of the boundary lines. The at least one ROI may be extracted based on a minimum height threshold and a minimum width threshold of the document. The method further includes determining a cluster of points corresponding to each corner of the at least one ROI based on a height of the ROI and contour detection. Further, the method includes determining a corner type of each of the corner to be one of a pointed corner or a curved corner based on determination of one or more parameters corresponding to an arc formed by the cluster of points of each of the corner. The method further includes determining the shape of the table to be a rounded corner structure in case the corner type of least two of the corners is determined as the curved corner.

In another embodiment, a system for determining shape of a table in a document including one or more processors and a memory is provided. The memory may store a plurality of processor-executable instructions which upon execution cause the one or more processors to determine a binarized image of the document. Further, the one or more processors may detect at least one region of interest (ROI) corresponding to the table based on detection of a plurality of lines. In an embodiment, the plurality of lines are detected based on a morphological operation. Further, boundary lines of the at least one ROI from the plurality of lines may be determined based on neighbourhood connectivity of pixels of the boundary lines. Further, the at least one ROI may be extracted based on a minimum height threshold and a minimum width threshold of the document image. Further, the processors may determine a cluster of points corresponding to each corner of the at least one ROI based on a height of the ROI and contour detection. Further, the processors may determine a corner type of each of the corner to be one of a pointed corner or a curved corner based on determination of one or more parameters corresponding to an arc formed by the cluster of points of each of the corner. Further, the processors may determine the shape of the table to be a rounded corner structure in case the corner type of least two of the corners is determined as the curved corner.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3B and FIG. 3C depicts an input document image and an output document image respectively, in accordance with an embodiment of the present disclosure.

FIG. 5 is a flowchart of a method of determining shape of a table in a document, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims. Additional illustrative embodiments are listed.

Documents may include text in various shapes and structures, for example, text may be present in tabular structures. Further, the tabular structure may also be of various shapes and sizes. In general, conventional methodologies rely on an assumption that a table is in general rectangular in shape. However, such methodologies prove to be erroneous when the shape of the tables varies from rectangular shape. Accordingly, tables which have rounded corners or curved corners may not be detected accurately by conventional methodologies. Therefore, the present disclosure provides methodologies based on image processing techniques that help to effectively detect and extract region of interests such as tables which have rounded or curved corners. This may allow for an effective and accurate extraction of data from such tables.

Figure 1:
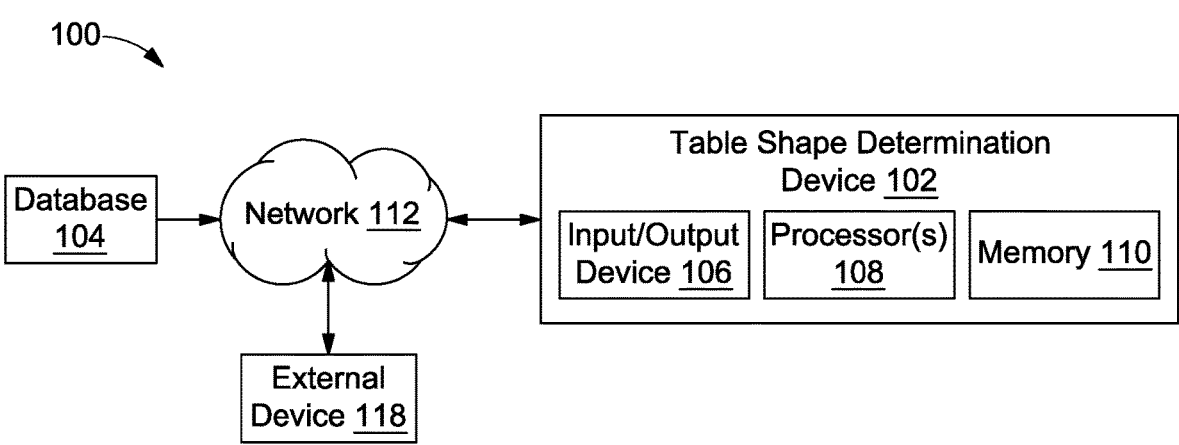
FIG. 1 is a block diagram of a table shape determination system, in accordance with an embodiment of the present disclosure.

The present disclosure provides methods and systems for determining shape of a table in a document. FIG. 1 is a block diagram of a table shape determination system 100 for determining shape of a table in a document, in accordance with an embodiment of the present disclosure. The table shape determination system 100 may include a table shape determination device 102 comprising one or more processors 108, a memory 110 and an input/output device 106. The table shape determination device 102 may be communicably connected to a database 104 and an external device 118 through a network 112. In an embodiment, the database 104 may be enabled in a cloud or a physical database comprising one or more document images comprising one or more tabular structures. In an embodiment, database 104 may store data inputted by an external device 118.

In an embodiment, the table shape determination device 102 may be communicatively coupled to an external device 118 through a wireless or wired communication network 112. In an embodiment, the table shape determination device 102 may receive a request for text or data extraction from the external device 118 through the network 112. In an embodiment, external device 118 may be a variety of computing systems, including but not limited to, a smart phone, a laptop computer, a desktop computer, a notebook, a workstation, a portable computer, a personal digital assistant, a handheld, a scanner, or a mobile device. In an embodiment, the table shape determination device 102 may be, but not limited to, in-built into the external device 118.

The table shape determination device 102 may include one or more processor(s) 108 and a memory 110. In an embodiment, examples of processor(s) 108 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. The memory 110 may store instructions that, when executed by the processor 108, cause the processor 108 to determine shape or structure of tables in document images, as discussed in greater detail below. The memory 110 may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In an embodiment, the communication network 112 may be a wired or a wireless network or a combination thereof. The network 112 can be implemented as one of the different types of networks, such as but not limited to, ethernetIP network, intranet, local area network (LAN), wide area network (WAN), the internet, Wi-Fi, LTE network, CDMA network, 4G, 5G communication and the like. Further, the network 112 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 112 can include a variety of network devices, including routers, bridges, servers, computing devices, storage devices, and the like.

Figure 2:
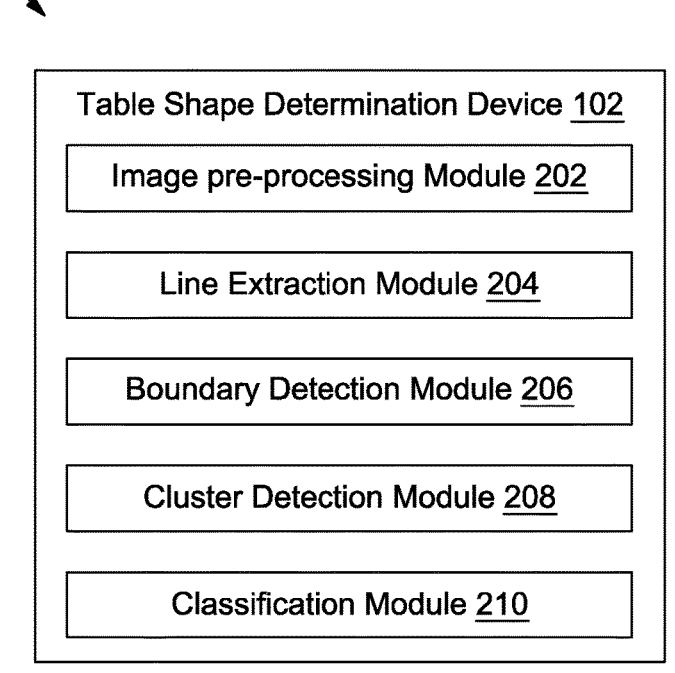
FIG. 2 illustrates a functional block diagram of the table shape determination device, in accordance with an embodiment of the present disclosure.

FIG. 2 illustrates a functional block diagram of the table shape determination device 102, in accordance with an embodiment of the present disclosure. Referring now to FIG. 2, a functional block diagram 200 of the table shape determination device 102 comprises an image pre-processing module 202, a line extraction module 204, a boundary detection module 206, a cluster detection module 208 and a classification module 210.

Figure 3A:
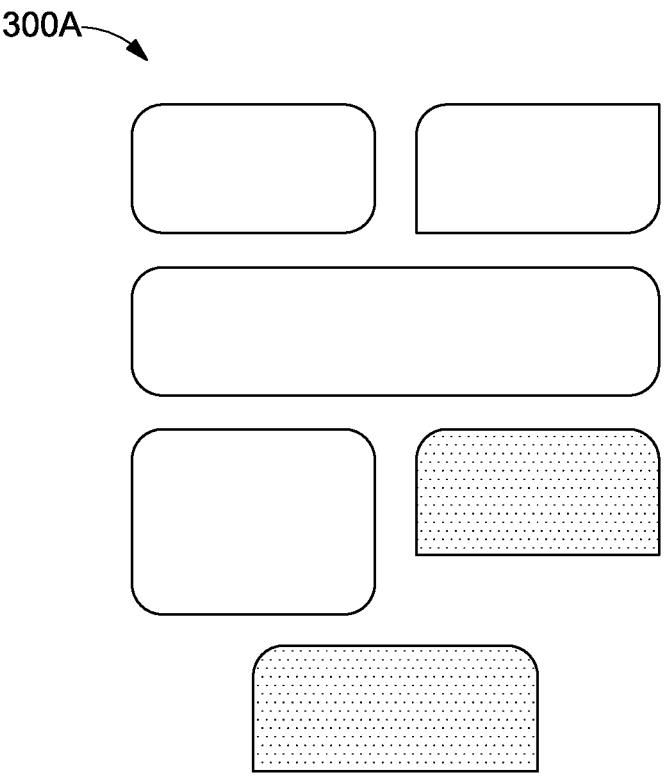
FIG. 3A illustrates exemplary table structures which may be determined, in accordance with an embodiment of the present disclosure.

A table structure in a document, as referred to herein, may be determined corresponding to at least one table structure present in the document image. A table structure as mentioned earlier may or may not be rectangular in shape. In an embodiment, the table structure may have rounded or curved corners. FIG. 3A illustrates exemplary table structures which may be determined, in accordance with an embodiment of the present disclosure. The table shape determination device 102 may determine shape and type of table structures that may be present in the document and classifies the structures based on the properties of the table structure.

The image pre-processing module 202 may pre-process the document images by resizing the document images and may generate binarized images of document images. The document images may be binarized in order to segment the images of document into foreground and background. Further, the table structure determination module may determine height and width of the resized document image. The document image may include various tables structures that may be detected as region of interests (ROIs) in the binarized document image.

The line extraction module 204 may generate horizontal and vertical line masks by detecting horizontal and vertical lines corresponding to each of the ROIs. Each of the ROIs detected in the binarized image may include horizontal and vertical lines therein. In an embodiment, the horizontal and vertical line masks may be generated based on morphological operations such as, but not limited to, operations based on dilation and erosion. In order to generate the horizontal and vertical line masks, first horizontal line mask may be determined by detecting horizontal lines corresponding to each ROI. Subsequently, vertical line mask may be determined by detecting vertical lines corresponding to each ROI. The horizontal and vertical line masks may be generated by merging or combining the horizontal line mask and vertical line mask.

Further, the boundary detection module 206 may determine boundary lines of each of the ROIs based on the vertical and horizontal line masks. In an embodiment, the boundary lines may be determined by determining the extreme horizontal and vertical lines of each of the ROIs. In order to do so, end points or pixels of the extreme horizontal and vertical lines may be determined. The horizontal and vertical lines may be determined by joining or extending the end points or pixels of the extreme horizontal and vertical lines so as to merge them with each other using neighbourhood connectivity of pixels.

Accordingly, the mask may consist of plurality of ROIs each of which may include two or more horizontal and vertical lines. Accordingly, each ROI may include four corners. In an embodiment, the boundary lines may be detected based on the neighbourhood connectivity of pixels based on the determined end points of the extreme horizontal lines and vertical lines. Further, the boundary detection module 206 may determine a height of each of the ROI based on the detection of extreme horizontal boundary lines. The extreme horizontal boundary lines may include the topmost horizontal line and the lower most horizontal line corresponding to an ROI. Based on determination of the height of each of the ROIs, ROIs may be extracted in case the height and width of an ROI are greater than or equal to a minimum height threshold and a minimum width threshold of the document. In an embodiment, the minimum height threshold and the minimum width threshold may be determined based on the height and the width of the document image respectively. In an embodiment, the minimum height threshold and the minimum width threshold may be determined based on a pre-defined percentage of the document height and document width respectively. Accordingly, a table structure may contain a combination of cells and a boundary or outline of the table. The shape of the table structure may be based on the shape of its boundary. Accordingly, the boundary detection module 206 may utilize an open-source contour detection image processing algorithm based on which outer boundary lines of each of the ROIs may be determined.

The cluster detection module 208 may determine a cluster of points corresponding to each corner of each of the ROIs. A cluster of points of a corner of an ROI may be determined in case a Euclidean distance between two consecutive points of the cluster of points corresponding to the corner is equal or less than a pre-defined threshold distance of the height of the ROI. In an embodiment, the pre-defined threshold distance may be equal to or less than fifteen percent of the height of the ROI.

Based on the determination of the cluster of points for each corners of the ROI, the cluster detection module 208 may determine if the corner is a rounded one by determining one or more parameters corresponding to an arc formed by the cluster of points. In an embodiment, the one or more parameters may include a length of the arc made by the cluster of points and an angle of curvature of the arc made by the cluster of points. In an embodiment, the arc length may be determined based on Euclidean distance between the cluster points corresponding to the arc. In an embodiment, angle of the arc may be determined based on an angle of a rotating bounding box corresponding to the cluster of points determined by mathematical calculations.

In an embodiment, in case the arc length of the cluster of points corresponding to a corner of an ROI is greater than a first predefined threshold and if a modulus division of the angle of the arc with respect to 90° is greater than a second predefined threshold then the classification module may determine that the corner type of the corner of the ROI is a curved corner. Otherwise, the corner type of the corner of the ROI is determined to be a pointed corner. In case two or more corners of an ROI are determined to be of curved corner type then the ROI is classified as a rounded structure. In case one or less corners are determined to be curved corner type then the ROI may be classified as other shape structure.

FIG. 3B and FIG. 3C depicts an input document image and an output document image respectively, in accordance with an embodiment of the present disclosure. Accordingly, one or more ROIs may be determined in the input image 300B and may be classified by the table shape determination device 102 as shown in output image 300C. The output image 300C shows ROIs corresponding to table structures 302, 304 and 306 are classified as rounded corner structure and 308 is classified as other shape structure in accordance with the present disclosure.

Figure 4:
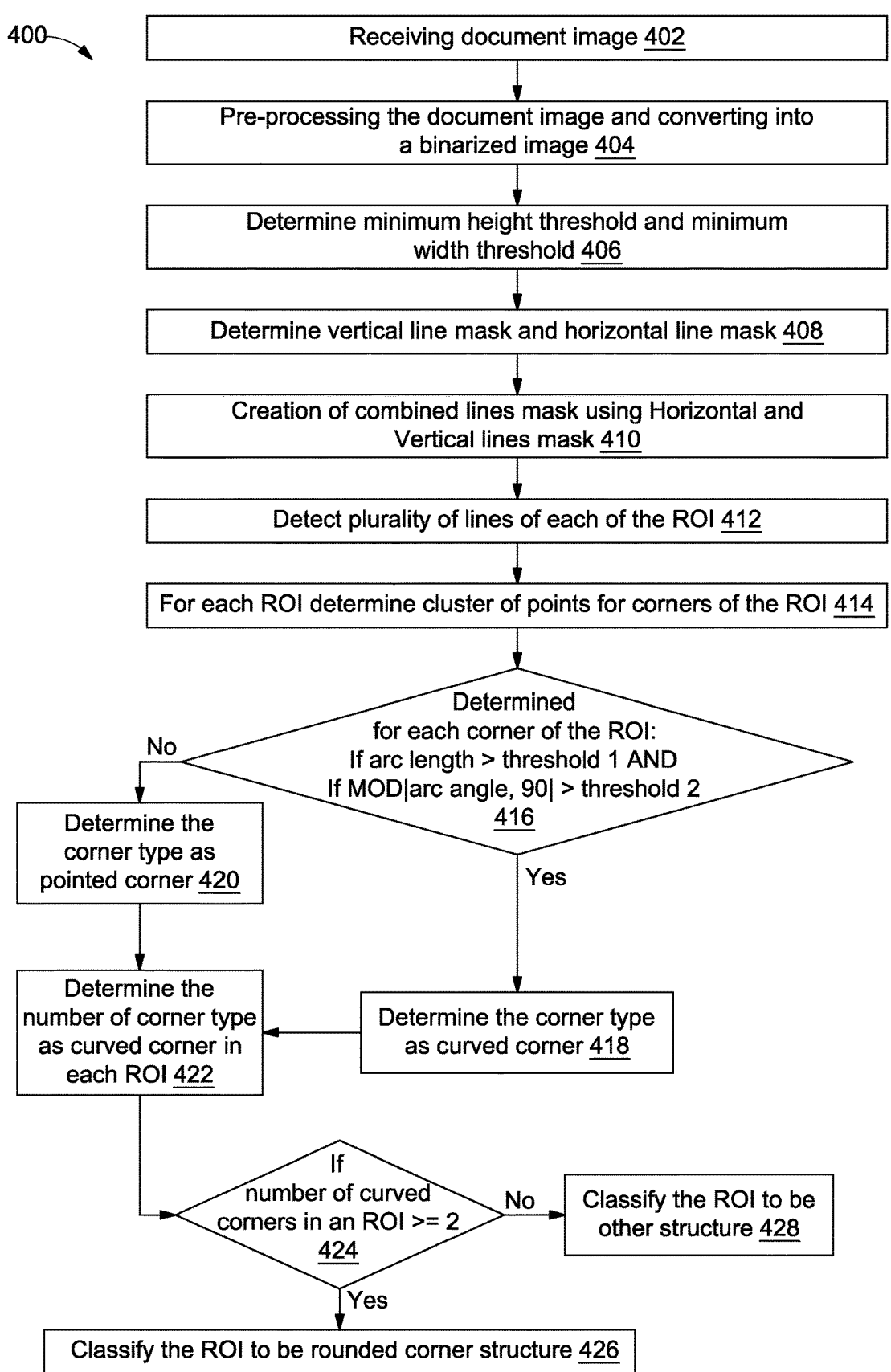
FIG. 4 is a flowchart depicting the methodology of classifying a table in a document, in accordance with an embodiment of the present disclosure.

FIG. 4 is a flowchart depicting methodology 400 of classifying a table in a document, in accordance with an embodiment of the present disclosure.

At step 402, an input document image may be received by the table shape determination device 102. At step 404, the received document image may be pre-processed to resize the document image and convert it into a binarized image. In an embodiment, the document image may be binarized in order to segment the image of document into foreground and background. At step 406, a height and width of the resized document image may be determined. Based on the determined height and width of the resized document image a minimum height threshold and a minimum width threshold may be determined. In an embodiment, the minimum height threshold maybe 3% of the height of the resized document image and the minimum width threshold may be 10% of the width of the resized document image. At step 408, vertical line mask and horizontal line mask may be generated. In an embodiment, the vertical lines may be detected corresponding to each of the ROIs detected in the document image in order to generate a vertical line mask. Similarly, horizontal lines may be detected corresponding to each of the ROIs detected in the document image in order to generate a horizontal line mask. In an embodiment, the horizontal and vertical line masks may be generated based on morphological operations such as, but not limited to, operations based on dilation and erosion.

At step, 410 a combined horizontal and vertical line mask may be generated by combining the vertical line mask and the horizontal line mask. In an embodiment, a bitwise AND function may be used to generate the combined horizontal and vertical line mask from the vertical line mask and the horizontal line mask.

At step 412, based on the combined horizontal and vertical line mask a plurality of lines of each of the detected ROIs may be determined by extending the horizontal and the vertical lines based on a neighbourhood connectivity of pixels of the extreme points of each of the horizontal and vertical lines. Accordingly, ROIs may be determined as closed structure having boundary lines. The boundary lines of each of the ROIs from the plurality of lines may also be determined based on neighbourhood connectivity of pixels of the boundary lines. Further, an ROI may be extracted in case a height of the detected ROI, determined as a distance between the top most horizontal line and the lower most horizontal line, is equal or greater than a predefined minimum height threshold and a width of the detected ROI, determined as a distance between the left most vertical line and the right most vertical line, is equal or greater than the predefined minimum width threshold as determined in step 406.

At step 414, a cluster of points corresponding to each of the corners of each of the ROIs based on a height of corresponding ROIs and contour detection may be determined. The cluster of points corresponding to a corner of an ROI may be determined in case a Euclidean distance between each point of the cluster of points is less than or equal to fifteen percent of a height of the ROI. Therefore, if an ROI has height 'h' the Euclidean distance between the points of the cluster of points of each corners of the ROI should be 0.15*h.

After determination of the cluster of points for each of the corners of the ROIs, one or more parameters of each of the cluster of points corresponding to each corner of an ROI may be determined. Further, the one or more parameters may include determination of arc length and angle of the arc formed by the cluster of points corresponding to each of the corners of the ROI.

At step 416, it may be determined, for each of the cluster of points for each corner of an ROI, if the arc length is greater than first pre-defined threshold level and also if a modular division of the angle of the arc is greater than second pre-defined threshold level. In an embodiment, the first predefined threshold level and the second predefined threshold level may be determined based on experimental data.

At step 418, a corner type of the corner of the ROI may be determined as curved corner in case the arc length is greater than the first pre-defined threshold level and also if a modular division of the angle of the arc is greater than the second pre-defined threshold level. Else, the corner type of the corner of the ROI is determined to be pointed structure at step 420.

At step 422, a number of corners of an ROI for which the corner type is determined as curved corners is determined.

At step 424, the number of corners of the ROI for which the corner type is determined as curved corners is determined to be greater than or equal to 2, then at step 426, the ROI may be classified as rounded corner structure. In case at step 424, the number of corners of the ROI for which the corner type is determined as curved corners is determined to be less than 2, then the ROI may be classified as other structure at step 428.

FIG. 5 is a flowchart of a method 500 of determining shape of a table in a document is provided. At step 502, a binarized image of the document may be determined. At step 504, at least one region of interest (ROI) corresponding to the table based on detection of a plurality of lines may be detected. In an embodiment, the plurality of lines may be detected based on a morphological operation. At step 506, boundary lines of the at least one ROI from the plurality of lines based on neighbourhood connectivity of pixels of the boundary lines may be determined. At step 508, at least one ROI may be extracted based on a minimum height threshold and a minimum width threshold of the document. At step 510, a cluster of points corresponding to each corner of the at least one ROI based on a height of the ROI and contour detection may be determined. Further, at step 512 a corner type of each of the corner may be determined to be one of a pointed corner or a curved corner based on determination of one or more parameters corresponding to an arc formed by the cluster of points of each of the corner. At step 514, in case the number of corners of an ROI determined to be of curved corner type is greater than or equal to two, then a rounded corner structure at step 516. In case, the number of corners of an ROI determined to be of curved corner type is less than two then the shape of the table may be determined to be other structure at step 518.

It is intended that the disclosure and examples be considered as exemplary only, with a true scope of disclosed embodiments being indicated by the following claims.

What is claimed is:

1. A method of determining shape of a table in a document, the method comprising:
   determining, by a processor, a binarized image of the document;
   detecting, by the processor, at least one region of interest (ROI) corresponding to the table based on detection of a plurality of lines,
      wherein the plurality of lines are detected based on a morphological operation;
   determining, by the processor, boundary lines of the at least one ROI from the plurality of lines based on neighbourhood connectivity of pixels of the boundary lines;
   extracting, by the processor, the at least one ROI based on a minimum height threshold and a minimum width threshold of the document;

determining, by the processor, a cluster of points corresponding to each corner of the at least one ROI based on a height of the ROI and contour detection;
      wherein the cluster of points corresponding to each corner is determined in case a successive Euclidean distance between each consecutive points of the cluster of points is less than 15% of the height of the ROI;
   determining, by the processor, a corner type of each of the corner to be one of a pointed corner or a curved corner based on determination of one or more parameters corresponding to an arc formed by the cluster of points of each of the corner; and
   determining, by the processor, the shape of the table to be a rounded corner structure in case the corner type of least two of the corners is determined as the curved corner.

2. The method of claim 1, wherein the one or more parameters corresponding to the arc formed by the cluster of points of each of the corners comprises an arc length and a modular division of an angle of the arc with respect to 90°.

3. The method of claim 2, wherein the corner type of each of the corners is determined as the curved corner in case the arc length is greater than a first threshold and the modular division of the angle of the arc with respect to 90° is greater than a second threshold.

4. The method of claim 1, wherein the plurality of lines comprises a plurality of horizontal and vertical lines corresponding to the at least one ROI.

5. A system of determining shape of a table in a document, comprising:
   one or more processors;
   a memory communicatively coupled to the processors, wherein the memory stores a plurality of processor-executable instructions, which, upon execution, cause the processors to:
   determine a binarized image of the document;
   detect at least one region of interest (ROI) corresponding to the table based on detection of a plurality of lines, wherein the plurality of lines are detected based on a morphological operation;
   determine boundary lines of the at least one ROI from the plurality of lines based on neighbourhood connectivity of pixels of the boundary lines;
   extract at least one ROI based on a minimum height threshold and a minimum width threshold of the document image;
   determine a cluster of points corresponding to each corner of the at least one ROI based on a height of the ROI and contour detection;
      wherein the cluster of points corresponding to each corner is determined in case a successive Euclidean distance between each consecutive points of the cluster of points is less than 15% of the height of the ROI;
   determine a corner type of each of the corner to be one of a pointed corner or a curved corner based on determination of one or more parameters corresponding to an arc formed by the cluster of points of each of the corner; and
   determine the shape of the table to be a rounded corner structure in case the corner type of least two corners is determined as the curved corner.

6. The system of claim 5, wherein the one or more parameters corresponding to the arc formed by the cluster of points of each of the corners comprises an arc length and a modular division of an angle of the arc with respect to 90°.

7. The system of claim 6, wherein the one or more processors determine the corner type of the corner as the curved corner in case the arc length is greater than a first threshold and the modular division of the angle of the arc with respect to 90° is greater than a second threshold.

8. The system of claim 5, wherein the plurality of lines comprises a plurality of horizontal and vertical lines corresponding to the at least one ROI.

9. A non-transitory computer-readable medium storing computer-executable instructions for determining shape of a table in a document, the stored computer-executable instructions, when executed by a processor, cause the processor to perform the steps of:

determining binarized image of the document;

detecting at least one region of interest (ROI) corresponding to the table based on detection of a plurality of lines, wherein the plurality of lines are detected based on a morphological operation;

determining boundary lines of the at least one ROI from the plurality of lines based on neighbourhood connectivity of pixels of the boundary lines;

extracting the at least one ROI based on a minimum height threshold and a minimum width threshold of the document;

determining a cluster of points corresponding to each corner of the at least one ROI based on a height of the ROI and contour detection;

wherein the cluster of points corresponding to each corner is determined in case a successive Euclidean distance between each consecutive points of the cluster of points is less than 15% of the height of the ROI;

determining a corner type of each of the corner to be one of a pointed corner or a curved corner based on determination of one or more parameters corresponding to an arc formed by the cluster of points of each of the corner; and determining the shape of the table to be a rounded corner structure in case the corner type of least two of the corners is determined as the curved corner.

10. The non-transitory computer-readable medium of claim 9, wherein the one or more parameters corresponding to the arc formed by the cluster of points of each of the corners comprises an arc length and a modular division of an angle of the arc with respect to 90°.

11. The non-transitory computer-readable medium of claim 10, wherein the corner type of each of the corners is determined as the curved corner in case the arc length is greater than a first threshold and the modular division of the angle of the arc with respect to 90° is greater than a second threshold.

12. The non-transitory computer-readable medium of claim 9, wherein the plurality of lines comprises a plurality of horizontal and vertical lines corresponding to the at least one ROI.

* * * * *